United States Patent [19]
Oosedo et al.

[11] Patent Number: 6,063,839
[45] Date of Patent: *May 16, 2000

[54] PREPREG OF REINFORCING FIBERS, EPOXY RESINS, CROSSLINKED RUBBER PARTICLES AND CURING AGENT

[75] Inventors: Hiroki Oosedo; Shunsaku Noda, both of Iyo-gun, Japan

[73] Assignee: Toray Industries, Inc., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/644,025

[22] Filed: May 9, 1996

[30] Foreign Application Priority Data

May 9, 1995 [JP] Japan .................................. 7-110888

[51] Int. Cl.[7] ............................ B32B 27/04; C08K 7/02; C08L 63/02; C08L 63/04
[52] U.S. Cl. ...................... 523/206; 428/297.4; 523/404; 523/407; 523/201; 525/65; 525/113
[58] Field of Search ..................... 523/201, 206, 523/210, 407, 413; 525/65, 902, 525

[56] References Cited

U.S. PATENT DOCUMENTS

| | | | |
|---|---|---|---|
| H1405 | 1/1995 | Pottick et al. | 525/92 |
| 4,419,496 | 12/1983 | Henton et al. | 525/902 |
| 4,500,660 | 2/1985 | Minamisawa et al. | 523/428 |
| 4,524,181 | 6/1985 | Adam et al. | 525/107 |
| 4,604,319 | 8/1986 | Evans et al. | 428/290 |
| 4,798,761 | 1/1989 | Wykowski et al. | 428/272 |
| 4,863,787 | 9/1989 | Gawin | 428/240 |
| 4,868,050 | 9/1989 | Tanaka et al. | 428/335 |
| 4,874,661 | 10/1989 | Browne er al. | 428/246 |
| 4,908,088 | 3/1990 | Boyd et al. | 156/307 |
| 4,954,195 | 9/1990 | Turpin | 156/242 |
| 4,992,325 | 2/1991 | Kim et al. | 428/241 |
| 4,999,238 | 3/1991 | Gawin | 428/283 |
| 5,025,045 | 6/1991 | Gawin et al. | 523/440 |
| 5,028,478 | 7/1991 | Odagiri et al. | 428/283 |
| 5,037,689 | 8/1991 | Boyd | 428/113 |
| 5,057,353 | 10/1991 | Maranci et al. | 428/147 |
| 5,087,657 | 2/1992 | Qureshi et al. | 524/508 |
| 5,089,560 | 2/1992 | Gardner et al. | 525/113 |
| 5,242,748 | 9/1993 | Folda et al. | 428/272 |
| 5,248,711 | 9/1993 | Buyny et al. | 523/500 |
| 5,290,857 | 3/1994 | Ashida et al. | 525/65 |
| 5,332,781 | 7/1994 | Eldin et al. | 525/530 |
| 5,426,150 | 6/1995 | Eldin et al. | 525/530 |
| 5,480,940 | 1/1996 | Khasat et al. | 525/75 |

FOREIGN PATENT DOCUMENTS

| | | |
|---|---|---|
| 2100026 | 1/1994 | Canada . |
| 1-292064 | 11/1989 | Japan . |
| 4-96921 | 3/1992 | Japan . |
| 5-339471 | 12/1993 | Japan . |
| 5-339472 | 12/1993 | Japan . |
| 6-157715 | 6/1994 | Japan . |
| 7-138550 | 5/1995 | Japan . |
| 8-81617 | 8/1996 | Japan . |
| 1 299 177 | 12/1972 | United Kingdom . |

*Primary Examiner*—Robert E. Sellers
*Attorney, Agent, or Firm*—Morrison & Foerster LLP

[57] ABSTRACT

Disclosed are epoxy resin compositions for fiber-reinforced composite materials, comprising an epoxy resin containing 70 parts by weight or more, per 100 parts by weight of the epoxy resin, of a bi-functional epoxy resin, fine particles comprising a rubber phase and substantially insoluble in epoxy resins and a curing agent. Also disclosed are prepregs and fiber-reinforced composite materials comprising the composition.

16 Claims, No Drawings

PREPREG OF REINFORCING FIBERS, EPOXY RESINS, CROSSLINKED RUBBER PARTICLES AND CURING AGENT

FIELD OF THE INVENTION

The present invention relates to epoxy resin compositions capable of giving composite materials with excellent impact resistance and also to prepregs and fiber-reinforced composite materials to be obtained from the compositions.

BACKGROUND OF THE INVENTION

As having especially excellent mechanical characteristics, fiber-reinforced composite materials comprising, as the intermediate bases, prepregs that comprise reinforcing fibers and matrix resins are widely used not only in sports goods but also in the aerospace industry and other various general industries.

Various methods are employed to produce fiber-reinforced composite materials. Above all, a method of using a prepreg which is a sheet-like intermediate base to be prepared by impregnating reinforcing fibers with a matrix resin is popularly used. The method gives shaped articles by laminating a plurality of such prepregs followed by heating the resulting laminate.

Recently, more lightweight sports goods with higher durability are desired. In particular, for ball game goods that shall undergo great instantaneous shock, such as golf club shafts, baseball bats, tennis and badminton rackets and hockey sticks, it is an important theme to improve the impact resistance of the materials for those goods in order to make them lightweight and have improved durability.

At present, (cured) epoxy resins with excellent mechanical and chemical characteristics including high heat resistance, high hardness, high dimension stability and high chemical resistance are essentially used as the matrix resins for fiber-reinforced composite materials (The term "epoxy resin" is generally used to mean both a prepolymer and a cured product to be obtained by mixing a prepolymer with a curing agent and other additives followed by curing the resulting composition. Unless otherwise specifically indicated, the term "epoxy resin" as referred to herein means a prepolymer.) However, since (cured) epoxy resins are defective in that they are brittle or, that is, their toughness is poor, there often occurs a problem in that fiber-reinforced composite materials comprising them have poor impact resistance.

Various attempts have heretofore been made to toughen (cured) epoxy resins to thereby improve the impact resistance of fiber-reinforced composite materials comprising the resins. To toughen (cured) epoxy resins, in general, methods of improving epoxy resins themselves and also curing agents and methods of adding modifiers to epoxy resins have been proposed.

One example of the methods of toughening (cured) epoxy resins by improving epoxy resins themselves and curing agents is to add thereto epoxy resins with flexible skeletons or flexibility-imparting curing agents. According to this, however, the degree of elastic modulus and the heat resistance of the resulting (cured) epoxy resins are lowered. Contrary to this, another example is to introduce rigid skeletons into epoxy resins and curing agents to lower the crosslinking degree of the cured resins while controlling the toughness, the elastic modulus and the heat resistance of the cured resins. For instance, in ACS Polym. Preprints, Vol. 29, No. 1 (1988), it is reported that the (cured) epoxy resins as obtained from fluorene type epoxy resins and curing agents can have improved toughness while preventing the lowering of their glass transition temperature. However, the proposed improvement requires extremely expensive epoxy resins and curing agents and shall be applied to only limited use.

One example of the methods of adding modifiers to epoxy resins is to add rubber components or thermoplastic resins to epoxy resin compositions to obtain cured resins with high toughness. (The term "rubber" as used herein includes all elastomers except thermoplastic elastomers.)

For example, Japanese Patent Publication Nos. 61-29613 and 62-34251 have proposed the addition of rubber components, in which carboxyl-terminated butadiene-acrylonitrile copolymer rubbers (CTBN) or nitrile rubbers are added to epoxy resins to modify the resins. Some of the proposed techniques have already been put to practical use. In the proposed methods, however, the rubber components added are once dissolved in epoxy resins and thereafter subjected to phase-separation during curing the resins. Therefore, the method are problematic in that it could not always produce the intended modifying results due to the possible change in the morphology of the cured products that depends on the types of the epoxy resins used and the curing conditions employed and that the rubber component added partly dissolves in the cured epoxy resin phase thereby often lowering the elastic modulus and the glass transition temperature of the (cured) epoxy resins.

To solve the problem in the morphology change that occurs in the toughening of (cured) epoxy resins by means of the addition of rubber components thereto, one method of dispersing rubber particles in epoxy resins is known. For example, Japanese Laid-Open Patent Nos. 58-83014 and 59-138254 have disclosed methods of polymerizing monomers such as acrylates and functional group-containing monomers capable of reacting with epoxy resins, such as acrylic acid, in epoxy resins to obtain epoxy resin compositions containing rubber particles formed and dispersed in the epoxy resins, which are to increase the shear strength of the adhesives. In these methods, however, the dissolution of a part of the rubber component in the cured epoxy resin phase is still inevitable and, in fact, these methods could not ensure sufficient heat resistance for the cured resin products.

In the method of adding thermoplastic resins, if thermoplastic resins having a high glass transition temperature are added, it may be possible to obtain cured products which are tough and which maintain their intrinsic heat resistance. However, in order to attain the intended object to obtain highly-toughened products, large amounts of such thermoplastic resins must be added, resulting in the increase in the viscosity of the reaction system and in the difficulty in the handling of the system. Thus, the method has such problems.

SUMMARY OF THE INVENTION

In order to attain the above-mentioned objects, the present invention provides an epoxy resin composition having the constitution mentioned below.

Precisely, the present invention provides an epoxy resin composition for fiber-reinforced composite materials, comprising the following constitutive elements [A], [B] and [C].

[A] An epoxy resin containing 70 parts by weight or more, per 100 parts by weight of the epoxy resin, of a bi-functional epoxy resin;

[B] fine particles which comprise a rubber phase and which are substantially insoluble in epoxy resins; and

[C] a curing agent.

The present invention also provides a prepreg to be prepared by impregnating reinforcing fibers with the above-mentioned epoxy resin composition. The present invention further provides a fiber-reinforced composite material comprising a cured product of the above-mentioned epoxy resin composition and reinforcing fibers.

DETAILED DESCRIPTION OF THE INVENTION

The constitutive element [A] is a single epoxy resin or a mixture of plural epoxy resins. The epoxy resin to be used herein is a compound having one or more epoxy groups in one molecule. It preferably includes epoxy resins to be derived from precursors of phenols, amines and compounds with carbon-carbon double bond(s) in view of the mechanical properties of the (cured) epoxy resins and of the reactivity thereof with curing agents.

Epoxy resins to be derived from precursors of phenols are obtained by reacting phenols and epichlorohydrin. The precursors include, for example, bisphenols such as bisphenol A and bisphenol F; resorcinol, dihydroxynaphthalene, trihydroxynaphthalene, dihydroxybiphenyl, bishydroxyphenylfluorene, trishydroxyphenylmethane, tetrakishydroxyphenylethane, novolaks, condensates of dicyclopentadiene and phenols, etc.

Epoxy resins to be derived from precursors of amines are obtained by reacting amines and epichlorohydrin. The precursors include, for example, tetraglycidyldiaminodiphenylmethane, aminophenol, aminocresol, xylenediamine, etc.

Epoxy resins to be derived from precursors of compounds with carbon-carbon double bond(s) are obtained by oxidizing the carbon-carbon double bond(s) in the precursors into epoxy group(s). The precursors include, for example, vinylcyclohexene, bis(3-vinylcyclohexylmethyl) adipate, 3-vinylcylohexylmethyl 3-vinylcyclohexane-carboxylate, etc. that are obtained from butadiene, crotonaldehyde, etc.

The fine particles comprising a rubber phase and insoluble in epoxy resins, which constitute the constitutive element [B] for use in the present invention, are to improve the toughness of the cured product of the epoxy resin composition containing them, and their effect depends on the compositional ratio of the components constituting the epoxy resin composition. Concretely, the toughness-improving effect is higher for the cured product with a lower crosslinking density. However, if the crosslinking density of the cured product is too low, such is unfavorable as lowering the elastic modulus and the heat resistance of the product.

Accordingly, the constitutive element [A] desirably has a composition capable of being cured into a cured product with a suitable crosslinking density. To adjust the crosslinking density of the cured product, in general, a plurality of different epoxy resins each having a different functional group number (this means the number of epoxy groups herein) per one molecule may be mixed at controlled ratios.

In order to make the cured product have a suitable crosslinking density, preferably employed are bi-functional epoxy resins (having two epoxy groups in one molecule) as the major moiety of the constitutive element [A]. In order to make the cured product have well-balanced physical properties, the epoxy resin for the constitutive element [A] comprises from 70 to 100 parts by weight, more preferably from 80 to 100 parts by weight, of a bi-functional epoxy resin per 100 parts by weight of the epoxy resin.

The constitutive element [A] may contain, as optional components other than the bi-functional epoxy resin, tri-functional or more multifunctional epoxy resins (having 3 or more epoxy groups in one molecule), and also reactive diluents (compounds having 1 or 2 epoxy groups in one molecule). If, however, tri-functional or more multifunctional epoxy resins having a too large functional group number are employed in the invention, the viscosity of the epoxy resin composition of the invention comes to be too high. If the composition having such a high viscosity is applied to reinforcing fibers to obtain a fiber-reinforced composite material, the impregnation of the fibers with the composition is difficult. Therefore, from tri-functional to hexa-functional epoxy resins are preferably employed in the invention.

Such tri-functional or more multifunctional epoxy resins are effective in improving the elastic modulus and the heat resistance of the cured product of the epoxy resin composition of the invention. If, however, too much amounts of such multifunctional epoxy resins are added, the cured product may have a too large crosslinking density and therefore could not have high toughness. It is desirable that the proportion of the tri-functional or more multifunctional epoxy resin is 30 parts by weight or less per 100 parts by weight of the epoxy resin for [A].

To mix the bi-functional epoxy resin and the tri-functional or more multifunctional epoxy resin to prepare the epoxy resin for [A], it is desirable that 100 parts by weight of the epoxy resin for [A] contains 70 parts by weight or more of the bi-functional epoxy resin and from 1 to 30 parts by weight of the tri-functional or more multifunctional epoxy resin, more preferably 80 parts by weight or more of the former and from 1 to 20 parts by weight of the latter.

Reactive diluents (compounds having 1 or 2 epoxy groups in one molecule) are generally compounds with a low viscosity and are effective for lowering the viscosity of the epoxy resin composition of the invention and also for lowering the crosslinking density of the cured product of the composition. However, if the composition contains a too large amount of such a reactive diluent, the elastic modulus and the heat resistance of the cured product will be often lowered. Therefore, it is preferable that the epoxy resin for [A] contains 30 parts by weight or less, per 100 parts by weight of the epoxy resin, of the reactive diluent but the epoxy resin may not contain the reactive diluent.

Another criterion for optimizing the crosslinking density of the cured epoxy resin product of the present invention is based on the epoxy equivalent of the constitutive element [A], which is obtained by dividing the mass (g) of the element [A] by the molar number of the epoxy groups in [A]. The epoxy equivalent of [A] can be obtained by means of titration or through calculation of the individual epoxy equivalents of the epoxy resins that constitute [A].

The priority application, Japanese Patent Application No. 7-110888 has disclosed an epoxy resin composition comprising 80 parts by weight or more, relative to 100 parts by weight of the total epoxy resin therein, of a bi-functional epoxy resin. The total epoxy equivalent of the epoxy resin in the composition disclosed therein is from 168 to 925, which is obtained through calculation of the individual epoxy equivalents of commercial epoxy resins constituting the composition.

If the total epoxy equivalent of the constitutive element [A] is large, the cured product may have a small crosslinking density. Therefore, the epoxy equivalent of [A] may be 250 or more. However, if the epoxy equivalent of [A] is too large, the cured product shall often have lowered elastic modulus and heat resistance or the epoxy resin composition shall often have an increased viscosity. Therefore, the epoxy equivalent of [A] is preferably from 250 to 400.

The bi-functional epoxy resin to be in the constitutive element [A] includes, for example, bisphenol A-type epoxy

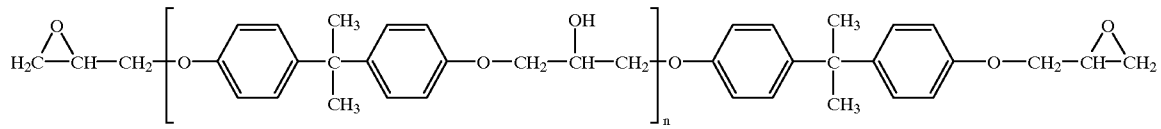

resins (epoxy resins to be derived from a precursor, bisphenol A), bisphenol F-type epoxy resins (epoxy resins to be derived from a precursor, bisphenol F), bisphenol S-type epoxy resins (epoxy resins to be derived from a precursor, bisphenol S), resorcinol-type epoxy resins (epoxy resins to be derived from a precursor, resorcinol), naphthalene-type epoxy resins (epoxy resins to be derived from a precursor, dihydroxynaphthalene), biphenyl-type epoxy resins (epoxy resins to be derived from a precursor, dihydroxybiphenyl), dicyclopentadiene-type epoxy resins (epoxy resins comprising condensates of dicyclopentadiene and phenols), wherein n represents a positive number and preferably n is 0 to 13.

Commercially-available bisphenol F-type epoxy resins are usable in the present invention, which include, for example, "Epikote 806" (having a mean molecular weight of 330 and an epoxy equivalent of from 160 to 170), "Epikote 807" (having a mean molecular weight of 335 and an epoxy equivalent of from 160 to 175) (both produced by Yuka-Shell Epoxy Co.); "Epiclon 830" (having a mean molecular weight of 345 and an epoxy equivalent of from 165 to 180) (produced by Dainippon Ink and Chemicals, Inc.), etc. These have the following chemical structures.

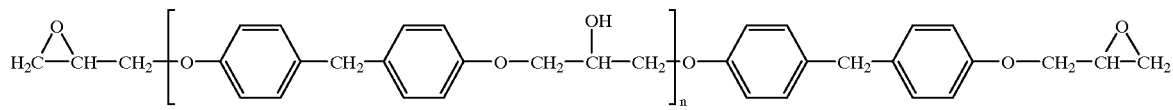

fluorene-type epoxy resins (epoxy resins to be derived from a precursor, bishydroxyphenylfluorene), etc. Of these, preferred are bisphenol A-type epoxy resins and bisphenol F-type epoxy resins, as being effective in well controlling the viscosity and the epoxy equivalent of the epoxy resin composition.

Commercially-available bisphenol A-type epoxy resins are usable in the present invention, which include, for example, "Epikote 825" (having a mean molecular weight of 350 and an epoxy equivalent of from 172 to 178), "Epikote 828" (having a mean molecular weight of 378 and an epoxy equivalent of from 184 to 194), "Epikote 834" (having a mean molecular weight of 500 and an epoxy equivalent of from 230 to 270), "Epikote 1001" (having a mean molecular weight of 950 and an epoxy equivalent of from 450 to 500), "Epikote 1004" (having a mean molecular weight of 1850 and an epoxy equivalent of from 875 to 975), "Epikote 1009" (having a mean molecular weight of 5700 and an epoxy equivalent of from 2400 to 3300) (all produced by Yuka-Shell Epoxy Co.); "Epotohto YD-128" (having a mean molecular weight of 378 and an epoxy equivalent of from 184 to 194) (produced by Thoto kasei Co.); "Epiclon 840" (having a mean molecular weight of 370 and an epoxy equivalent of from 180 to 190), "Epiclon 850" (having a mean molecular weight of 378 and an epoxy equivalent of from 184 to 194), "Epiclon 830" (having a mean molecular weight of 350 and an epoxy equivalent of from 165 to 185), "Epiclon 1050" (having a mean molecular weight of 950 and an epoxy equivalent of from 450 to 500) (all produced by Dainippon Ink and Chemicals, Inc.); "Sumi-epoxy ELA-128" (having a mean molecular weight of 378 and an epoxy equivalent of from 184 to 194) (produced by Sumitomo Chemical Co.); DER 331 (having a mean molecular weight of 374 and an epoxy equivalent of from 182 to 192) (produced by Dow Chemical Co.), etc. These have the following chemical structures.

wherein n represents a positive number and preferably n is 0 to 2.

The bi-functional epoxy resin to be in the constitutive element [A] is preferably comprised of a liquid, bi-functional epoxy resin with a low molecular weight (n is 0–0.5) and a low epoxy equivalent and a solid, bi-functional epoxy resin with a high molecular weight (n is 1–13) and a high epoxy equivalent, by which the viscosity and the epoxy equivalent of the epoxy resin composition may be suitably controlled.

The liquid, bi-functional epoxy resin preferably has a mean molecular weight of from 200 to 600 and an epoxy equivalent of from 100 to 300, more preferably a mean molecular weight of from 300 to 400 and an epoxy equivalent of from 150 to 200. The solid, bi-functional epoxy resin preferably has a mean molecular weight of from 730 to 10000 and an epoxy equivalent of from 350 to 5000, more preferably a mean molecular weight of from 800 to 4000 and an epoxy equivalent of from 400 to 2000.

The tri-functional or more multifunctional epoxy resin, which may be optionally added to the constitutive element [A], includes phenol-novolak-type epoxy resins, cresol-novolak-type epoxy resins, glycidylamine-type epoxy resins such as tetraglycidyldiaminodiphenylmethane and triglycidylaminophenol, glycidyl ether-type epoxy resins such as tetrakis(glycidyloxyphenyl)ethane and tris(glycidyloxy)methane, etc. Of these, preferred are phenol-novolak-type epoxy resins (epoxy resins to be derived from precursors, phenol-novolaks) in view of the viscosity of the resin compositions comprising them and of the elastic modulus and the heat resistance of the cured products of the compositions. Commercially-available phenol-novolak-type epoxy resins are usable in the present invention, which include, for example, "Epikote 152" (having a mean molecular weight of 351 and an epoxy equivalent of from 172 to 179), "Epikote 154" (having a mean molecular weight of 625 and an epoxy equivalent of from 176 to 181) (both produced by Yuka-Shell Epoxy Co.); DER 438 (having a mean molecular weight of 625 and an epoxy equivalent of from 176 to 181) (produced by Dow Chemical Co.); "Araldite EPN1138" (having a mean molecular weight of 625 and an epoxy equivalent of from 176 to 181), "Araldite EPN1139" (having a mean molecular weight of 351 and an epoxy equivalent of from 172 to 179) (both produced by Ciba Co.), etc. These have the following chemical structures.

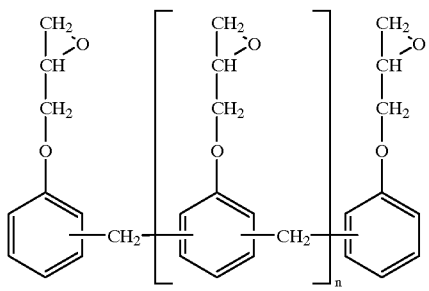

wherein n represents a positive number and preferably n is 0.2 to 4.

Specific examples of the reactive diluent for use in the present invention include butyl glycidyl ether, 2-ethylhexyl glycidyl ether, phenyl glycidyl ether, cresyl glycidyl ether, p-sec-butyl glycidyl ether, p-tert-butyl glycidyl ether, etc.

The epoxy resin composition of the present invention that comprises, as the constitutive element [B], fine particles comprising a rubber phase and insoluble in epoxy resins can give a cured product having heat resistance which is comparable to that of the cured product of an epoxy resin composition not containing such fine particles, since the fine particles in the composition are insoluble in epoxy resins. In addition, the epoxy resin composition of the present invention is additionally characterized in that the physical properties including toughness of the cured product of the composition are stable since the morphology of the cured product does not vary irrespective of the types of the epoxy resin matrices used and the curing conditions employed. The fine particles for use in the present invention which comprise a rubber phase and which are insoluble in epoxy resins are referred to. Rubber polymers as obtained by polymerizing monomers in epoxy resins contain rubber components as dissolved in the dispersing media, epoxy resins. If added to epoxy resin compositions, these have negative influences on the heat resistance and other physical properties of the cured products of the compositions. Therefore, such rubber polymers as polymerized in epoxy resins are unsuitable to the present invention. If, on the other hand, fine particles added to epoxy resin compositions contain volatile dispersing media, such volatile dispersing media must be removed in any step for the production of fiber-reinforced composite materials using the resin compositions. If the removal is unsatisfactorily conducted, the remaining volatile dispersing media produce voids in the fiber-reinforced composite materials. For these reasons, in conducting the present invention, it is desirable that the fine particles constituting the element [B] are directly added to epoxy resins, without being dispersed in any volatile dispersing media such as water and organic solvents, and are uniformly dispersed in the epoxy resins, for example, by stirring under heat. Specifically, it is desirable that the constitutive element [B] of fine particles which comprise a rubber phase and which are insoluble in epoxy resins is directly added to the constitutive element [A] of epoxy resins and uniformly dispersed in the latter at from 50° C. to 200° C. by using a kneader such as a stirring motor, a kneader or a three-roll mill.

In order to uniformly disperse the fine particles comprising a rubber phase and substantially insoluble in epoxy resin, that constitute the constitutive element [B], in the epoxy resins constituting the constitutive element [A], preferably employed is a method of previously dispersing the fine particles in a liquid epoxy resin to prepare a master resin followed by adding the other components thereto to prepare the resin composition of the present invention.

The fine particles comprising a rubber phase and insoluble in epoxy resins include, for example, fine, crosslinked rubber particles comprising only a rubber phase and fine core/shell polymer particles comprising a rubber phase and a non-rubber resin phase.

The fine, crosslinked rubber particles can be obtained, for example, by copolymerizing single or plural unsaturated compounds with crosslinking monomers.

The unsaturated compound includes, for example, aliphatic olefins such as ethylene, propylene; aromatic vinyl compounds such as styrene, methylstyrene; conjugated diene compounds such as butadiene, dimethylbutadiene, isoprene, chloroprene; unsaturated carboxylates such as methyl acrylate, propyl acrylate, butyl acrylate, methyl methacrylate, propyl methacrylate, butyl methacrylate; vinyl cyanides such as acrylonitrile, etc.

The unsaturated compound may have functional group(s) reactive with epoxy resins or curing agents, such as carboxyl, epoxy, hydroxyl, amino and amido groups. Examples of the compound include acrylic acid, glycidyl methacrylate, vinylphenol, acrylamide, etc.

Examples of the crosslinking monomer are compounds having a plurality of polymerizing double bonds in the molecule, such as divinylbenzene, diallyl phthalate, ethylene glycol dimethacrylate, etc.

The fine particles can be produced by various conventional polymerization modes of, for example, emulsion polymerization, suspension polymerization, etc. One typical emulsion polymerization is to polymerize the unsaturated compound(s) and crosslinking monomers in the presence of a radical polymerization initiator, a molecular weight-controlling agent such as mercaptan or halogenated hydrocarbons, and an emulsifier. At the pre-determined degree of conversion for polymerization, a polymerization stopper is added to the polymerization system, by which the polymerization is stopped. Next, the non-reacted monomers are removed from the polymerization system, for example, through distillation with steam to finally obtain a copolymer latex. The removal of water from the latex thus obtained by the emulsion polymerization produces crosslinked rubber particles.

Commercially-available, crosslinked rubber particles can also be used in the present invention, which include, for example, XER-91 comprising a crosslinked product of a carboxyl-modified butadiene-acrylonitrile copolymer (produced by Japan Synthetic Rubber Co.), CX-MN series comprising fine acrylic rubber particles (produced by Nippon Shokubai Co.), YR-500 series (produced by Thoto kasei Co.), etc.

Fine core/shell polymer particles usable in the present invention are fine, spherical polymer particles where the core and the surface layer are made of different polymers. As such particles, known are fine, two-phase-structured core/shell polymer particles with a single core phase and a single shell phase, and fine, multi-phase-structured core/shell polymer particles composed of, for example, a single soft core and plural shell phases of a hard shell, a soft shell and a hard shell that cover the core in that order. The term "soft" as referred to herein indicates a rubber phase, while "hard" indicates a non-rubber resin phase. The term "rubber" as referred to herein is meant to indicate a polymer having a glass transition temperature lower than room temperature (25° C.).

Of the above-mentioned fine particles, those with soft core/hard shell structures are preferably employed in the present invention as being well dispersed in epoxy resins.

The core component to be in the fine, core/shell polymer particles with soft core/hard shell structures may include the same polymers as those referred to hereinabove for the crosslinked rubber particles.

Of these, conjugated diene rubbers, alkyl acrylate rubbers having a carbon number of an alkyl group of 2 to 8 or mixtures of these rubbers are preferably used as a main component. Such conjugated dienes or alkyl acrylates can be copolymerized with monomers which are copolymerizable. The monomers include, for example, aromatic compounds such as styrene, vinyl toluene, aromatic vinylidene, vinyl cyanides such as acrylonitrile and methacrylonitrile, and alkyl methacrylate such as methyl methacrylate.

The shell component to be in the particles may be a polymer having a glass transition temperature not lower than room temperature (25° C.), which includes, for example, Polystyrenes, homopolymers of acrylonitrile, methyl acrylate or methyl methacrylate, copolymers such as methyl methacrylate/alkyl acrylates and methacrylic acid/acrylic acid, and also terpolymers such as styrene/acrylonitrile/glycidyl methacrylate. Also usable are copolymers with unsaturated compounds having functional group(s) reactive with epoxy resins or curing agents (e.g., carboxyl, epoxy, hydroxyl, amino and amido groups), such as acrylic acid, methacrylic acid, itaconic acid, glycidyl methacrylate, hydroxyethyl methacrylate, dimethylaminomethyl methacrylate, methacrylamide, etc. Rather preferably, the shell component comprises a polymer with no reactive functional group, such as polymethyl methacrylate, since the dispersibility of the fine particles in epoxy resins is good.

Of these, the core/shell polymer particles are preferably such that the core is a polybutadiene or polybutyl acrylate and the shell is an acrylate or methacrylate polymer. In this regard, it is particularly preferred that the core or the shell comprises the respective compound in an amount of 65% or more by weight. Among these core/shell polymer particles, it is even more preferred that the core comprises butadiene in an amount of 65 to 85% by weight and styrene in an amount of 15 to 35% by weight, and the shell comprises methylmethacrylate in an amount of 70 to 97% by weight and alkylmethacrylate having a carbon number of an alkyl group of 2 to 8 in an amount of 3 to 30% by weight as giving a high impact strength.

Preferably, the fine core/shell polymer particles are such that the content of the core component is from 10 to 90% by weight and that of the shell component is from 10 to 90% by weight. If the content of the core component is less than 10% by weight, a sufficient effect for the improvement in toughness of the cured product could not often be obtained, but if it is more than 90% by weight, the complete covering of the core with the shell would often be difficult with the result that the dispersibility of the fine particles would be insufficient.

The fine core/shell polymer particles can be produced by known methods, for example, by the methods disclosed in U.S. Pat. No. 4,419,496, European Patent 45,357, Japanese Laid-Open Patent No. 55-94917, etc. Commercially-available products of fine core/shell polymer particles can be used in the present invention. Such commercially-available products include, for example, "Kureha Paraloid EXL-2655" comprising butadiene-alkyl methacrylate-styrene copolymers (produced by Kureha Chemical Industry Co.); "Staphyloid AC-3355, TR-2122" comprising acrylate-methacrylate copolymers (produced by Takeda Chemicals Industry Co.); "Paraloid EXL-2611, EXL-3387" comprising butyl acrylate-methyl methacrylate copolymers (produced by Rohm & Haas Co.), etc.

A plurality of different types of the fine particles which comprise a rubber phase and which are insoluble in epoxy resins, such as those mentioned hereinabove, can be combined for use in the present invention.

The fine particles preferably have a mean particle size of 10 $\mu$m or less, more preferably 5 $\mu$m or less. If their sizes are too large, it would be difficult for them to pass through the voids between reinforcing fibers when the fibers are impregnated with the matrix resin and, as a result, it would be often difficult to make them uniformly distributed throughout the fibers.

The proportion of the constitutive element [B] comprising the fine particles, which comprise a rubber phase and which are insoluble in epoxy resins, to the constitutive element [A] is from 1 to 20 parts by weight of the particles to 100 parts by weight of the epoxy resin. If it is less than 1 part by weight, the effect for the improvement in impact resistance of the cured product may be insufficient, but if it is more than 20 parts by weight, the viscosity of the resin composition may be too high and, as a result, it would be often difficult to make the particles infiltrated into reinforcing fibers.

The curing agent to be used as the constitutive element [C] includes, for example, aromatic amines such as diaminodiphenylmethane, diaminodiphenylsulfone; aliphatic amines such as triethylenetetramine, isophoronediamine; imidazole derivatives; dicyandiamide; tetramethylguanidine; carboxylic acid anhydrides such as methylhexahydrophthalic anhydride; carboxylic acid hydrazides such as adipic acid hydrazide; carboxylic acid amides; polyphenol compounds; polymercaptans; Lewis acid complexes such as boron trifluoride-ethylamine complex, etc.

Additives with curing activity that are obtained by reacting the curing agents with epoxy resins can also be employed in the present invention.

Microcapsules of the curing agents are preferably employed, since they prolong the shelf life of the prepregs comprising them.

The curing agents can be combined with curing accelerators in order to increase their curing activity. Preferred examples include a combination of dicyandiamide and a curing accelerator selected from urea derivatives and imidazole derivatives, and a combination of a carboxylic anhydride or polyphenol compound and a curing accelerator selected from tertiary amines and imidazole derivatives.

Urea derivatives usable as the curing accelerator may be compounds that are obtained by reacting secondary amines with isocyanates, for example, those having the following chemical structures.

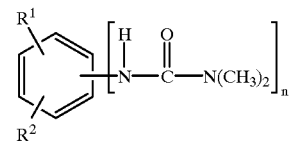

wherein $R^1$ and $R^2$ each represent a group selected from H, Cl, $CH_3$, $OCH_3$ and $NO_2$; and n=1 or 2.

Concretely, 3-phenyl-1,1-dimethylurea and 3-(3,4-dichlorophenyl)-1,1-dimethylurea (DCMU) are preferably used.

The epoxy resin composition for fiber-reinforced composite materials of the present invention, which comprises the constitutive elements [A], [B] and [C], may additionally contain a thermoplastic resin as the optional component. The addition of such a thermoplastic resin may control the viscosity of the resin composition, may facilitate the handlability of the prepreg comprising the composition and may improve the adhesiveness between the matrix resin and reinforcing fibers.

The thermoplastic resin to be used preferably has hydrogen-bonding functional groups in view of its compatibility with epoxy resins and its adhesiveness to reinforcing fibers.

The hydrogen-bonding functional groups include, for example, alcoholic hydroxyl groups, amido groups, imido groups and sulfonyl groups.

Thermoplastic resins with alcoholic hydroxyl groups include, for example, polyvinylacetal resins such as polyvinyl formal and polyvinyl butyral, and phenoxy resins; those with amido groups include, for example, polyamides; those with imido groups include, for example, polyimides; those with sulfonyl groups include, for example, polysulfones. The polyamides, polyimides and polysulfones may have ether bonds and functional groups such as carbonyl groups in their main chains. The polyamides may have a substituent at the nitrogen atom of the amide group.

Examples of commercially-available thermoplastic resins which are soluble in epoxy resins and which have hydrogen-bonding functional groups include polyvinyl acetal resins of "Denka Butyral" and "Denka Formal" (both produced by Denki Kataku kogyo K.K.), "Vinylec" (produced by Chisso Co.); phenoxy resins of "UCAR PKHP" (produced by Union Carbide Co.); polyamide resins of "Macromelt" (produced by Henchel-Hakusui Co.), "Amilan CM4000" (produced by Toray Industries, Inc.); polyimide resins of "Ultem" (produced by General Electric Co.), "Matrimide 5218" (produced by Ciba Co.); polysulfone resins of "Victrex" (produced by Mitsui Toatsu Chemical Co.), "UDEL" (produced by Union Carbide Co.). These have the following chemical structures in which n, l and m each represent a positive number and preferably, as follows:

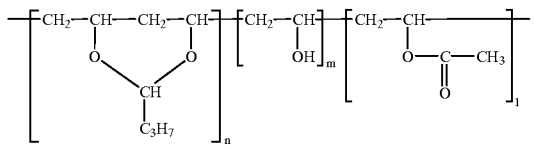

where n is 219–240, m is 60–72, and l is 0–9;

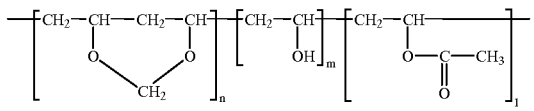

where n is 365, m is 22–30, and l is 42–59;

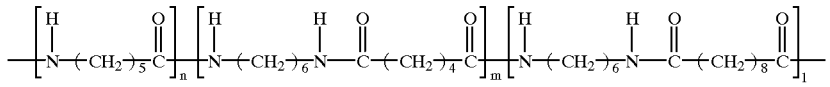

where n is 37–40, m is 32–35, and l is 23–26;

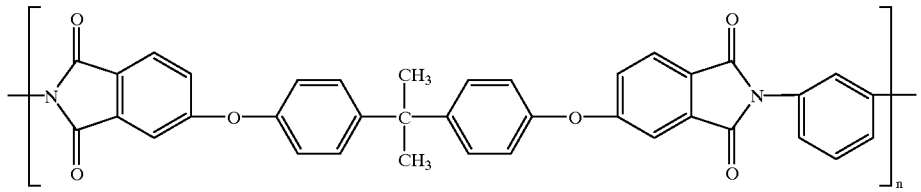

where n is about 20;

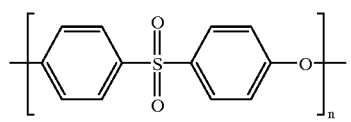

where n is 50–80;

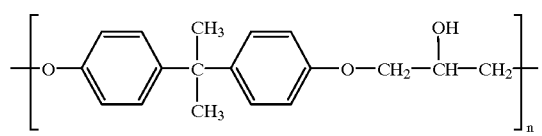

where n is 35–57;

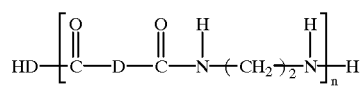

where n is 5–60
wherein D represents a hydrocarbon group having 32 carbon atoms in the dimer acid molecule.

The polyvinyl acetal resins are preferably polyvinyl formal resins having vinyl formal moieties at 60% by weight or more in view of their mechanical properties. Two or more of the above-mentioned resins may be combined for use in the present invention.

Of the above-mentioned thermoplastic resins, those having a degree of bending elastic modulus of 10 MPa or more at room temperature, concretely at 25° C. are preferred, since they hardly lower the elastic modulus of the cured product of the epoxy resin composition.

Preferably, the thermoplastic resins are thermodynamically soluble in epoxy resins at from 50° C. to 200° C. at least when they are added to the composition of the present invention. Even though soluble therein but if their solubility is too low, they are ineffective in improving the physical properties of the resulting composites. Therefore, it is desirable that their solubility in epoxy resins is above a predetermined level. As the index for selecting and using thermoplastic resins with high solubility, employable is a solubility parameter Sp that can be calculated on the basis of their molecular structures. In order to attain the sufficient solubility of thermoplastic resins in epoxy resins, it is preferable that the difference in Sp between the total thermoplastic resins used and the total epoxy resins used is between 0 and 2, more preferably between 0 and 1.5, in terms of the absolute value.

In order to reduce the absolute difference in Sp between them, the epoxy resins to be used are optimally selected while the proportion of the thermoplastic resins to the epoxy resins is optimized and the structures of the thermoplastic resins to be used are optimally selected. Where a plurality of epoxy resins are combined with a plurality of thermoplastic resins, the mean Sp value of the epoxy resins that shall be calculated by totaling the data to be obtained by multiplying the Sp value of each epoxy resin used by the weight fraction thereof is compared with the Sp value of each thermoplastic resin used.

The solubility parameter reflects the polarity of the molecular structure. Since epoxy resins have large polarity, it is preferable that the thermoplastic resins to be added thereto have suitable polar moieties in their molecular structures.

Where the composition of the present invention contains thermoplastic resins such as those mentioned hereinabove, the proportion of the thermoplastic resins is desirably from 1 to 20 parts by weight relative to 100 parts by weight of the epoxy resins in the composition, as giving a suitable viscoelasticity parameter to the epoxy resin composition while producing composite materials with good physical properties.

The epoxy resin composition of the present invention may further contain, in addition to the above-mentioned epoxy resins, fine particles, curing agents and thermoplastic resins, additives such as polymer compounds other than the above-mentioned ones, antioxidants, organic or inorganic particles with no rubber phase.

As polymer compounds, those soluble in epoxy resins can be added to the composition for various purposes. Concretely mentioned are amino-functional silicone resins which are to roughen the cured products, such as those described in European Patent 475611 (corresponding to Japanese Laid-Open Patent No. 6-93103). For controlling the rheology of the matrix resins, polyester-type or polyamide-type thermoplastic elastomers can be used.

As antioxidants, preferably used are phenolic antioxidants such as 2,6-di-tert-butyl-p-cresol (BHT), butylated hydroxyanisole, tocopherol; and sulfur antioxidants such as dilauryl 3,3'-thiodipropionate, distearyl 3,3'-thiodipropionate, etc.

As organic particles other than the epoxy resin-insoluble, fine particles with a rubber phase which are indispensable in the present invention, employable are fine particles of thermoplastic resins, thermosetting resins (including cured resins), etc. The particles of thermoplastic resins include those of polyamide resins; the particles of thermosetting resins include those of cured epoxy resins and phenolic resins. These organic particles are added essentially for the purpose of additionally improving the toughness of the cured products and of controlling the rheology of the compositions.

As inorganic particles, employable are particles of silica, alumina, smectite, synthetic mica, etc. These inorganic particles are added essentially for the purpose of controlling the rheology of the compositions or, that is, increasing the viscosity of the compositions or making the compositions thixotropic.

By impregnating reinforcing fibers with the epoxy resin composition of the present invention, a prepreg is formed which is used as the intermediate base for fiber-reinforced composite materials.

Where prepregs comprising epoxy resins are handled, their tackiness and drapability have great influences on their handlability and therefore shall be optimized. The tackiness and drapability of prepregs with epoxy resins have relation to the viscoelasticity of the matrix resins therein. The dynamic viscoelasticity of epoxy resins varies, depending on the temperature and the frequency at which it is measured. As the value that typically indicates the viscoelastic behavior of epoxy resins at about room temperature, referred to is a complex coefficient of viscosity $\eta^*$ of epoxy resins to be measured at a temperature of 50° C. and at a frequency of 0.5 Hz. Epoxy resins having a complex coefficient of viscosity $\eta^*$ of from 200 to 2,000 Pa·s may produce prepregs with especially excellent characteristics including tackiness and drapability as mentioned above and are therefore preferable. High-viscosity epoxy resins having a complex coefficient of viscosity $\eta^*$ above the scope often produce prepregs with insufficient drapability, and the impregnation of reinforcing fibers with such high-viscosity epoxy resins is often difficult. Unidirectional prepregs with low-viscosity epoxy resins having a complex coefficient of viscosity $\eta^*$ below the scope are problematic in that their shape retention is often poor.

As the reinforcing fibers, employable are glass fibers, carbon fibers, aramide fibers, boron fibers, alumina fibers, silicon carbide fibers, etc. Two or more types of these fibers can be combined.

The morphology and the location of the reinforcing fibers for use in the present invention are not specifically defined. For example, employable are long fibers as paralleled in one direction, single tows, woven fabrics, mats, knitted fabrics, braids, etc.

In order to obtain more lightweight shaped articles with higher durability, carbon fibers are especially preferably employed. In order to produce more lightweight sports goods such as golf club shafts and fishing rods, it is desirable to use carbon fibers with high elastic modulus in prepregs. Using even a small amount of such carbon fibers, the products may exhibit sufficient toughness. The carbon fibers preferably have a modulus of elastic modulus of 200 GPa or more, more preferably from 210 to 800 GPa.

To produce prepregs of the present invention, employable are a wet method of dissolving the matrix resin in a solvent such as methyl ethyl ketone or methanol to thereby lower the viscosity of the resin followed by impregnating reinforcing fibers with the resulting solution, and a hot-melting (dry) method of heating the matrix resin to thereby lower its viscosity followed by impregnating reinforcing fibers with the resin.

According to the wet method, reinforcing fibers are dipped in a solution of the epoxy resin composition and then drawn up, and the solvent is vaporized in an oven or the like to obtain a prepreg.

According to the hot-melting method, the epoxy resin composition as previously heated to lower its viscosity is directly applied to reinforcing fibers to obtain a resin-impregnated prepreg; or alternatively, the epoxy resin composition is once coated on a release paper or the like to form a resin-coated film, and the film is applied onto one or both surfaces of a sheet of reinforcing fibers and then pressed under heat to obtain a resin-impregnated prepreg. The hot-melting method is preferred since no solvent remains in the prepreg.

To produce a composite article from the prepreg, for example, a plurality of the prepregs are laminated and subjected to pressure under heat to thereby cure the resins therein.

To apply heat and pressure to the laminate of prepregs, for example, employable are a pressing method, an autoclaving method, a packing method, a tape-wrapping method and an inner pressure method. For the production of sports goods, a tape-wrapping method and an inner pressure method are especially preferably employed.

According to the tape-wrapping method, prepregs are wound around a mandrel or the like to be shaped into a cylindrical article. The method is suitable for producing rod-like articles such as golf club shafts and fishing rods. Concretely, prepregs are wound around a mandrel and then wrapped with a wrapping tape made of a thermoplastic resin film, by which the prepregs are fixed and through which pressure is applied to the prepregs, and the thus-wound mandrel is heated in an oven to thereby cure the resins in the prepregs. After this, the mandrel is pulled out to obtain a cylindrical article.

According to the inner pressure method, prepregs are wound around an inner pressure support such as a thermoplastic resin tube or the like to give a preform, this is set in a mold, and a high-pressure vapor is introduced into the inner pressure support to apply pressure to the preform, while heating the mold, to obtain a shaped article. This method is suitably employed for shaping articles with complicated forms, such as golf club shafts, bats, tennis and badminton rackets, etc.

Without previously forming prepregs, the epoxy resin composition of the present invention may be directly applied to reinforcing fibers and then cured under heat. For this, for example, employable are a hand-lay-up method, a filament-winding method, a pultrusion-molding method, a resin-injection-molding method, a resin-transfer-molding method, etc. According to these methods, fiber-reinforced composite materials are also obtained. In these, two liquids, one comprising the essential components of the constitutive elements [A] and [B] and the other comprising a curing agent of the constitutive element [C], may be mixed just before use.

The fiber-reinforced composite material of the present invention, which may be shaped by various shaping methods such as those mentioned hereinabove, has excellent impact resistance and therefore can be used in various ball game goods, such as golf club shafts, baseball bats, tennis or badminton rackets, hockey sticks, etc., and also in aircraft parts.

Since the fiber-reinforced composite material to be obtained by combining the epoxy resin composition of the present invention and reinforcing fibers has higher impact resistance than any conventional fiber-reinforced composite material in the prior art, even a smaller amount of the former can exhibit impact resistance comparable to that of a larger amount of the latter. Therefore, using the former of the present invention, it is possible to design lightweight articles.

Next, the present invention is described in detail by means of the following examples, in which the solubility parameter, the epoxy equivalent, the dynamic viscoelasticity, the Charpy impact strength and the glass transition temperature were measured or evaluated under the conditions mentioned below.

A. Solubility Parameter:

The solubility parameter Sp was obtained according to the method described in Polym. Eng. Sci., 14 (2), 147–154 (1974).

B. Epoxy Equivalent:

The epoxy equivalent indicates the mass weight of the resin composition containing one g-equivalent of epoxy group. This was obtained through titration of the epoxy resin composition in accordance with JIS K 7236 for "Test Method for Determining Epoxy Equivalent of Epoxy Resin" or from the epoxy equivalent of each epoxy resin used to prepare the composition.

C. Dynamic Viscoelasticity:

To determine the dynamic viscoelasticity, used was Dynamic Analyzer RDA II Model produced by Rheometrix Co. Briefly, parallel discs each having a radius of 25 mm were used, and the complex coefficient of viscosity $\eta^*$ was obtained at a temperature of 50° C. and at a frequency of 0.5 Hz.

D. Charpy Impact Test for Fiber-reinforced Composite Material:

The Charpy impact test was conducted according to JIS K 7077. Briefly, a test piece having a width of 10 mm and a length of 80 mm was cut out of the fiber-reinforced composite material to be tested, a flat-wise impact of 300 kg·cm was imparted to one surface of the test piece in the direction vertical to its surface. No notch was formed in the test piece.

E. Glass Transition Temperature of Fiber-Reinforced Composite Material:

Using Mettler DSC-T 3000 System (produced by Mettler Co.), the glass transition temperature of each sample was measured at a heating rate of 40° C./min.

EXAMPLE 1

(1) Preparation of Matrix Resin Composition:

Of the following raw materials, fine rubber particles were first dispersed in liquid bisphenol A-type epoxy resin "Epikote 828" to prepare a master resin, which was then kneaded along with the other components in a kneader to prepare a matrix resin composition. The chemical structures of the raw materials used are shown below.

| | |
|---|---|
| Bisphenol A-type epoxy resin ("Epikote 828" produced by Yuka-Shell Epoxy Co.; having a mean molecular weight of 378 and an epoxy equivalent of from 184 to 194) | 35 parts by weight |
| Bisphenol A-type epoxy resin ("Epikote 1001" produced by Yuka-Shell Epoxy Co.; having a mean molecular weight of 950 and an epoxy equivalent of from 450 to 500) | 55 parts by weight |
| Phenol-novolak-type epoxy resin ("Epikote 154" produced by Yuka-Shell Epoxy Co.; having a mean molecular weight of 625 and an epoxy equivalent of from 176 to 181) | 10 parts by weight |
| Fine rubber particles ("Kureha Paraloid EXL-2655" produced by Kureha Chemical Industry Co.; core/shell polymer particle is composed of a core comprising butadiene-styrene copolymer and a shell comprising alkyl methacrylate polymer) | 10 parts by weight |
| Dicyandiamide ("Epicure DICY7" produced by Yuka-Shell Epoxy Co.; having a molecular weight of 84.1) | 4 parts by weight |
| DCMU ("DCMU-99" produced by Hodogaya Chemical Industry Co.; having a molecular weight of 233.1) | 4 parts by weight |
| Polyvinyl formal resin ("Vinylec K" produced by Chisso Co.) | 3 parts by weight |

"Epikote 828" (n = 0.14) and "Epikote 1001" (n = 2.0):

-continued

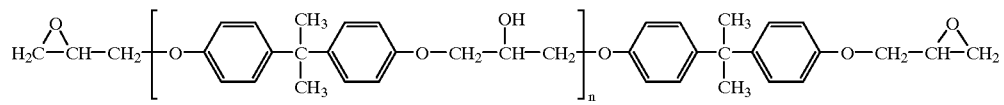

"Epikote 154" (n = 1.5):

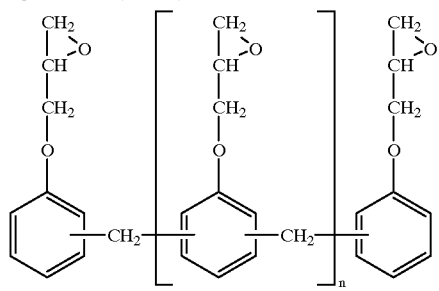

"Epicure DICY7":

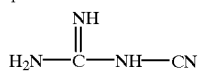

"DCMU-99":

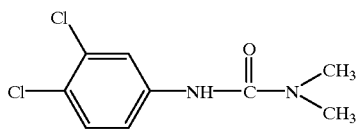

"Vinylec K" (n = 365, m = 22–30, l = 42–59):

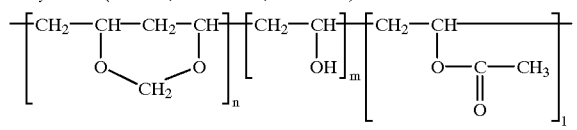

(2) Formation of Prepreg:

The resin composition prepared above was coated onto a release paper, using a reverse roll coater, to form a resin film. Next, carbon fibers "Torayca T700S" (produced by Toray Co.) with a modulus of tensile elastic modulus of 230 GPa that had been sheet-wise oriented in one direction were sandwiched between two sheets of the resin film, pressed under heat to thereby make the fibers impregnated with the resins. Thus was formed a unidirectional prepreg having a weight of carbon fibers of 150 g/m² and a weight fraction of the matrix resin of 33%.

(3) Formation and Evaluation of Fiber-Reinforced Composite Material:

21 pieces as cut out of the prepreg were laminated and autoclaved at 135° C. for 2 hours under 0.29 MPa (3 kgf/cm²) to obtain a sheet of fiber-reinforced composite material.

The sheet was subjected to a Charpy impact test, which showed a high impact value of 138 kJ/m². The glass transition temperature of the sheet was measured according to the DSC method to be 130° C. The results are shown in Table 1 below.

Since the epoxy resin composition contained fine core/shell polymer particles comprising a rubber phase and insoluble in epoxy resins, the fiber-reinforced composite material comprising the composition had excellent impact resistance and heat resistance.

EXAMPLE 2

(1) Preparation of Matrix Resin Composition:

Of the following raw materials, fine rubber particles were first dispersed in liquid bisphenol A-type epoxy resin "Epikote 828" to prepare a master resin, which was then kneaded along with the other components in a kneader to prepare a matrix resin composition.

| | |
|---|---|
| Bisphenol A-type epoxy resin ("Epikote 828" produced by Yuka-Shell Epoxy Co.; having a mean molecular weight of 378 and an epoxy equivalent of from 184 to 194) | 35 parts by weight |
| Bisphenol A-type epoxy resin ("Epikote 1001" produced by Yuka-Shell Epoxy Co.; having a mean molecular weight of 950 and an epoxy equivalent of from 450 to 500) | 40 parts by weight |
| Phenol-novolak-type epoxy resin ("Epikote 154" produced by Yuka-Shell Epoxy Co.; having a mean molecular weight of 625 and an epoxy equivalent of from 176 to 181) | 25 parts by weight |
| Fine rubber particles ("Staphyloid AC-3355" produced by Takeda Chemicals Industry Co.; core/shell polymer particles comprising acrylate-methacrylate copolymers) | 10 parts by weight |
| Dicyandiamide ("Epicure DICY7" produced by Yuka-Shell Epoxy Co.; having a molecular weight of 84.1) | 4 parts by weight |
| DCMU ("DCMU-99" produced by Hodogaya | 4 parts by weight |

-continued

| | |
|---|---|
| Chemical Industry Co.; having a molecular weight of 233.1) | |
| Polyvinyl formal resin ("Vinylec K" produced by Chisso Co.) | 5 parts by weight |

(2) Formation of Prepreg:

Using the resin composition prepared above, et prepreg was formed in the same manner as in Example 1.

(3) Formation and Evaluation of Fiber-Reinforced Composite Material:

Using the prepreg prepared above, a sheet of fiber-reinforced composite material was formed in the same manner as in Example 1. The Charpy impact strength of the sheet was 130 kJ/m$^2$ and the glass transition temperature thereof was 138° C. (see Table 1).

Since the resin composition of Example 2 contained a larger amount of the multifunctional epoxy resin, phenol-novolak-type epoxy resin than that of Example 1, the glass transition temperature of the fiber-reinforced composite sheet of Example 2 was somewhat hither than that of the sheet of Example 1 but the Charpy impact strength of the former was somewhat lower than that of the latter.

EXAMPLE 3

(1) Preparation of Matrix Resin Composition:

Of the following raw materials, fine rubber particles were first dispersed in liquid bisphenol A-type epoxy resin "Epikote 828" to prepare a master resin, which was then kneaded along with the other components in a kneader to prepare a matrix resin composition. The chemical structure of the raw material, "Victrex PES5003P" used is shown below.

| | |
|---|---|
| Bisphenol A-type epoxy resin ("Epikote 828" produced by Yuka-Shell Epoxy Co.; having a mean molecular weight of 378 and an epoxy equivalent of from 184 to 194) | 40 parts by weight |
| Bisphenol A-type epoxy resin ("Epikote 1001" produced by Yuka-Shell Epoxy Co.; having a mean molecular weight of 950 and an epoxy equivalent of from 450 to 500) | 60 parts by weight |
| Fine rubber particles ("Kureha Paraloid EXL-2655" produced by Kureha Chemical Industry Co.; core/shell polymer particle is composed of a core comprising butadiene-styrene copolymer and a shell comprising alkyl methacrylate polymer) | 10 parts by weight |
| Dicyandiamide ("Epicure DICY7" produced by Yuka-Shell Epoxy Co.; having a molecular weight of 84.1) | 4 parts by weight |
| DCMU ("DCMU-99" produced by Hodogaya Chemical Industry Co.; having a molecular weight of 233.1) | 4 parts by weight |
| Polyether sulfone ("Victrex PES5003P" produced by Mitsui Toatsu Chemical Co.) | 6 parts by weight |

"Victrex PES5003P" (n = 50–80)

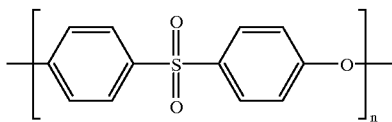

(2) Formation of Prepreg:

Using the resin composition prepared above, a prepreg was formed in the same manner as in Example 1.

(3) Formation and Evaluation of Fiber-Reinforced Composite Material:

Using the prepreg prepared above, a sheet of fiber-reinforced composite material was formed in the same manner as in Example 1. The Charpy impact strength of the sheet was 147 kJ/m$^2$ and the glass transition temperature thereof was 125° C. (see Table 1).

Since the resin composition of Example 3 did not contain the multifunctional epoxy resin, phenol-novolak-type epoxy resin, unlike the resin compositions of Examples 1 and 2, the Charpy impact strength of the sheet of Example 3 was higher than that of the sheets of Examples 1 and 2 but the glass transition temperature of the former was somewhat lower than that of the latter.

EXAMPLE 4

(1) Preparation of Matrix Resin Composition:

Of the following raw materials, fine rubber particles were first dispersed in liquid bisphenol A-type epoxy resin "Epikote 828" to prepare a master resin, which was then kneaded along with the other components in a kneader to prepare a matrix resin composition. The chemical structure of the raw material, "Epiclon HP-4032H" used is shown below.

| | |
|---|---|
| Bisphenol A-type epoxy resin ("Epikote 828" produced by Yuka-Shell Epoxy Co.; having a mean molecular weight of 378 and an epoxy equivalent of from 184 to 194) | 40 parts by weight |
| Naphthalene-type epoxy resin ("Epiclon HP-4032H: produced by Dainippon Ink and Chemicals, Inc.; having a molecular weight of 300 and an epoxy equivalent of 150) | 60 parts by weight |
| Fine rubber particles ("Paraloid EXL-2611" produced by Rohm & Haas Co.; core/shell polymer particles) | 15 parts by weight |
| Dicyandiamide ("Epicure DICY7" produced by Yuka-Shell Epoxy Co.; having a molecular weight of 84.1) | 4 parts by weight |
| DCMU ("DCMU-99" produced by Hodogaya Chemical Industry Co.; having a molecular weight of 233.1) | 4 parts by weight |

"Epiclon HP-4032H"

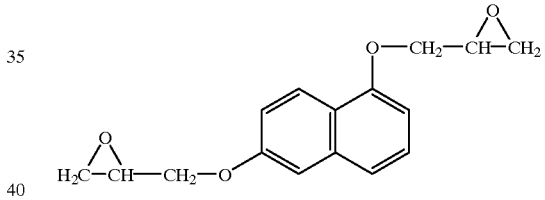

(2) Formation of Prepreg:

Using the resin composition prepared above, a prepreg was formed in the same manner as in Example 1.

(3) Formation and Evaluation of Fiber-Reinforced Composite Material:

Using the prepreg prepared above, a sheet of fiber-reinforced composite material was formed in the same manner as in Example 1. The Charpy impact strength of the sheet was 151 kJ/m$^2$ and the glass transition temperature thereof was 150° C. (see Table 1).

Since the resin composition of Example 4 contained a naphthalene-type epoxy resin with a rigid skeleton in place of the bisphenol A-type epoxy resin used in Example 3, the glass transition temperature of the fiber-reinforced composite sheet comprising the composition was much higher.

EXAMPLE 5

(1) Preparation of Matrix Resin Composition:

Of the following raw materials, fine rubber particles were first dispersed in liquid bisphenol A-type epoxy resin "Epikote 828" to prepare a master resin, which was then kneaded along with the other components in a kneader to prepare a matrix resin composition.

| | |
|---|---|
| Bisphenol A-type epoxy resin ("Epikote 828" produced by Yuka-Shell Epoxy Co.; having a mean molecular weight of 378 and an epoxy equivalent of from 184 to 194) | 40 parts by weight |
| Bisphenol A-type epoxy resin ("Epikote 1001" produced by Yuka-Shell Epoxy Co.; having a mean molecular weight of 950 and an epoxy equivalent of from 450 to 500) | 60 parts by weight |
| Fine rubber particles ("XER 91" produced by Nippon Synthetic Rubber Co.; crosslinked product of carboxyl-modified butadiene-acrylonitrile copolymer) | 7 parts by weight |
| Dicyandiamide ("Epicure DICY7" produced by Yuka-Shell Epoxy Co.; having a molecular weight of 84.1) | 4 parts by weight |
| DCMU ("DCMU-99" produced by Hodogaya Chemical Industry Co.; having a molecular weight of 233.1) | 4 parts by weight |

(2) Formation of Prepreg:

Using the resin composition prepared above, a prepreg was formed in the same manner as in Example 1.

(3) Formation and Evaluation of Fiber-Reinforced Composite Material:

Using the prepreg prepared above, a sheet of fiber-reinforced composite material was formed in the same manner as in Example 1. The Charpy impact strength of the sheet was 142 kJ/m$^2$ and the glass transition temperature thereof was 128° C. (see Table 1).

The resin composition of Example 5 contained crosslinked rubber particles in place of the core/shell polymer particles used in Examples 1 to 4, and the fiber-reinforced composite sheet comprising the composition had good impact resistance and heat resistance.

EXAMPLE 6

(1) Preparation of Matrix Resin Composition:

Of the following raw materials, fine rubber particles were first dispersed in liquid bisphenol A-type epoxy resin "Epikote 828" to prepare a master resin, which was then kneaded along with the other components in a kneader to prepare a matrix resin composition. The chemical structure of the raw material, "Sumi-epoxy ELM-120" used is shown below.

| | |
|---|---|
| Bisphenol A-type epoxy resin ("Epikote 828" produced by Yuka-Shell Epoxy Co.; having a mean molecular weight of 378 and an epoxy equivalent of from 184 to 194) | 30 parts by weight |
| Bisphenol A-type epoxy resin ("Epikote 1001" produced by Yuka-Shell Epoxy Co.; having a mean molecular weight of 950 and an epoxy equivalent of from 450 to 500) | 60 parts by weight |
| Glycidylamine-type epoxy resin ("Sumi-epoxy ELM-120" produced by Sumitomo Chemical Industry Co.; having a mean molecular weight of 360 and an epoxy equivalent of from 110 to 130) | 10 parts by weight |
| Fine rubber particles ("Kureha Paraloid EXL-2655" produced by Kureha Chemical Industry Co.; core/shell polymer particle is composed of a core comprising butadiene-styrene copolymer and a shell comprising alkyl methacrylate polymer) | 10 parts by weight |
| Dicyandiamide ("Epicure DICY7" produced by Yuka-Shell Epoxy Co.; having a molecular weight of 84.1) | 4 parts by weight |
| DCMU ("DCMU-99" produced by Hodogaya Chemical Industry Co.; having a molecular weight of 233.1) | 4 parts by weight |
| Polyvinyl formal resin ("Vinylec K" produced by Chisso Co.) | 8 parts by weight |

"Sumi-epoxy ELM-120":

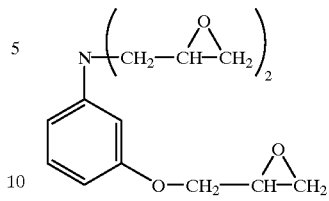

(2) Formation of Prepreg:

Using the resin composition prepared above, a prepreg was formed in the same manner as in Example 1.

(3) Formation and Evaluation of Fiber-Reinforced Composite Material:

Using the prepreg prepared above, a sheet of fiber-reinforced composite material was formed in the same manner as in Example 1. The Charpy impact strength of the sheet was 159 kJ/m$^2$ and the glass transition temperature thereof was 134° C. (see Table 1).

The resin composition of Example 6 contained a multifunctional, glycidylamine-type epoxy resin, and the fiber-reinforced composite sheet comprising the composition had good impact resistance and heat resistance.

EXAMPLE 7

(1) Preparation of Matrix Resin Composition:

Of the following raw materials, fine rubber particles were first dispersed in liquid bisphenol A-type epoxy resin "Epikote 828" to prepare a master resin, which was then kneaded along with the other components in a kneader to prepare a matrix resin composition.

| | |
|---|---|
| Bisphenol A-type epoxy resin ("Epikote 828" produced by Yuka-Shell Epoxy Co.; having a mean molecular weight of 378 and an epoxy equivalent of from 184 to 194) | 45 parts by weight |
| Bisphenol A-type epoxy resin ("Epikote 1004" produced by Yuka-Shell Epoxy Co.; having a mean molecular weight of 1850 and an epoxy equivalent of from 875 to 975) | 40 parts by weight |
| Phenol-novolak-type epoxy resin ("Epikote 154" produced by Yuka-Shell Epoxy Co.; having a mean molecular weight of 625 and an epoxy equivalent of from 176 to 181) | 35 parts by weight |
| Fine rubber particles ("Kureha Paraloid EXL-2655" produced by Kureha Chemical Industry Co.; core/shell polymer particle is composed of a core comprising butadiene-styrene copolymer and a shell comprising alkyl methacrylate polymer | 4 parts by weight |
| Dicyandiamide ("Epicure DICY7" produced by Yuka-Shell Epoxy Co.; having a molecular weight of 84.1) | 4 parts by weight |
| DCMU ("DCMU-99" produced by Hodogaya Chemical Industry Co.; having a molecular weight of 233.1) | 4 parts by weight |

(2) Formation of Prepreg:

Using the resin composition prepared above, a prepreg was formed in the same manner as in Example 1.

(3) Formation and Evaluation of Fiber-Reinforced Composite Material:

Using the prepreg prepared above, a sheet of fiber-reinforced composite material was formed in the same manner as in Example 1. The Charpy impact strength of the sheet was 169 kJ/m$^2$ and the glass transition temperature thereof was 93° C. (see Table 1).

The resin composition of Example 7 had a large total epoxy resin equivalent and gave a toughened, fiber-reinforced composite material having a large Charpy impact strength. However, since the viscosity of the composition was high, the impregnation of the reinforcing fibers with the composition was not good. The composite material obtained had a glass transition temperature lower than that of the others.

COMPARATIVE EXAMPLE 1

(1) Preparation of Matrix Resin Composition:

Of the following raw materials, fine rubber particles were first dispersed in liquid bisphenol A-type epoxy resin "Epikote 828" to prepare a master resin, which was then kneaded along with the other components in a kneader to prepare a matrix resin composition.

| | |
|---|---|
| Bisphenol A-type epoxy resin ("Epikote 828" produced by Yuka-Shell Epoxy Co.; having a mean molecular weight of 378 and an epoxy equivalent of from 184 to 194) | 30 parts by weight |
| Bisphenol A-type epoxy resin ("Epikote 1001" produced by Yuka-Shell Epoxy Co.; having a mean molecular weight of 950 and an epoxy equivalent of from 450 to 500) | 35 parts by weight |
| Phenol-novolak-type epoxy resin ("Epikote 154 produced by Yuka-Shell Epoxy Co.; having a mean molecular weight of 625 and an epoxy equivalent of from 176 to 181) | 35 parts by weight |
| Fine rubber particles ("Kureha Paraloid EXL-2655" produced by Kureha Chemical Industry Co.; core/shell polymer particle is composed of a core comprising butadiene-styrene copolymer and a shell comprising alkyl methacrylate polymer | 10 parts by weight |
| Dicyandiamide ("Epicure DICY7" produced by Yuka-Shell Epoxy Co.; having a molecular weight of 84.1) | 4 parts by weight |
| DCMU ("DCMU-99" produced by Hodogaya Chemical Industry Co.; having a molecular weight of 233.1) | 4 parts by weight |

(2) Formation of Prepreg:

Using the resin composition prepared above, a prepreg was formed in the same manner as in Example 1.

(3) Formation and Evaluation of Fiber-Reinforced Composite Material:

Using the prepreg prepared above, a sheet of fiber-reinforced composite material was formed in the same manner as in Example 1. The Charpy impact strength of the sheet was 119 kJ/m$^2$ and the glass transition temperature thereof was 140° C. (see Table 1).

Since the resin composition of Comparative Example 1 contained more than 30 parts by weight of the multifunctional, phenol-novolak-type epoxy resin, it did not express the advantage of the core/shell polymer particles contained therein and the Charpy impact value of the sheet comprising the composition was low.

COMPARATIVE EXAMPLE 2

(1) Preparation of Matrix Resin Composition:

The following raw materials were kneaded in a kneader to prepare a matrix resin composition.

| | |
|---|---|
| Bisphenol A-type epoxy resin ("Epikote 828" produced by Yuka-Shell Epoxy Co.; having a mean molecular weight of 378 and an epoxy equivalent of from 184 to 194) | 30 parts by weight |
| Bisphenol A-type epoxy resin ("Epikote 1001" produced by Yuka-Shell Epoxy Co.; having a mean molecular weight of 950 and an epoxy equivalent of from 450 to 500) | 35 parts by weight |
| Phenol-novolak-type epoxy resin ("Epikote 154 produced by Yuka-Shell Epoxy Co.; having a mean molecular weight of 625 and an epoxy equivalent of from 176 to 181) | 35 parts by weight |
| Dicyandiamide ("Epicure DICY7" produced by Yuka-Shell Epoxy Co.; having a molecular weight of 84.1) | 4 parts by weight |
| DCMU ("DCMU-99" produced by Hodogaya Chemical Industry Co.; having a molecular weight of 233.1) | 4 parts by weight |
| Polyvinyl formal resin ("Vinylec K" produced by Chisso Co.) | 4 parts by weight |

(2) Formation of Prepreg:

Using the resin composition prepared above, a prepreg was formed in the same manner as in Example 1.

(3) Formation and Evaluation of Fiber-Reinforced Composite Material:

Using the prepreg prepared above, a sheet of fiber-reinforced composite material was formed in the same manner as in Example 1. The Charpy impact strength of the sheet was 103 kJ/m$^2$ and the glass transition temperature thereof was 141° C. (see Table 1).

Since the resin composition of Comparative Example 2 did not contain fine particles which comprise a rubber phase and which are insoluble in epoxy resins, the composite sheet comprising the composition did not have good impact resistance.

COMPARATIVE EXAMPLE 3

(1) Preparation of Matrix Resin Composition:

The following raw materials were kneaded in a kneader to prepare a matrix resin composition.

| | |
|---|---|
| Bisphenol A-type epoxy resin ("Epikote 828" produced by Yuka-Shell Epoxy Co.; having a mean molecular weight of 378 and an epoxy equivalent of from 184 to 194) | 40 parts by weight |
| Bisphenol A-type epoxy resin ("Epikote 1001" produced by Yuka-Shell Epoxy Co.; having a mean molecular weight of 950 and an epoxy equivalent of from 450 to 500) | 60 parts by weight |
| CTBN-epoxy reactant | 10 parts by weight |
| Dicyandiamide ("Epicure DICY7" produced by Yuka-Shell Epoxy Co.; having a molecular weight of 84.1) | 4 parts by weight |
| DCMU ("DCMU-99" produced by Hodogaya Chemical Industry Co.; having a molecular weight of 233.1) | 4 parts by weight |

The CTBN-epoxy reactant used was a reaction product of "Hycar CTBN 1300×13" (produced by Ube Industries, Ltd.; having an AN content of 27%) and "Epikote 828" and had a number-average molecular weight of 9600.

(2) Formation of Prepreg:

Using the resin composition prepared above, a prepreg was formed in the same manner as in Example 1.

(3) Formation and Evaluation of Fiber-Reinforced Composite Material:

Using the prepreg prepared above, a sheet of fiber-reinforced composite material was formed in the same manner as in Example 1. The Charpy impact strength of the sheet was 149 kJ/m$^2$ and the glass transition temperature thereof was 108° C. (see Table 1).

Since the resin composition of Comparative Example 3 contained rubber soluble in epoxy resins, the glass transition temperature of the sheet comprising the composition was low and the sheet had poor heat resistance though the impact resistance of the sheet was good.

TABLE 1

| Resin Composition | Example 1 | Example 2 | Example 3 | Example 4 | Example 5 |
|---|---|---|---|---|---|
| [A] Epoxy Resin (wt. pts.) | | | | | |
| [A-1] Bi-functional Epoxy Resin | | | | | |
| "Epikote 828" (epoxy equivalent: 184–184, Sp: 10.6 cal$^{1/2}$/cm$^{2/3}$) | 35 | 35 | 40 | 40 | 40 |
| "Epikote 1001" (epoxy equivalent: 450–500, Sp: 11.5 cal$^{1/2}$/cm$^{2/3}$) | 55 | 40 | 60 | — | 60 |
| "Epikote 1004" (epoxy equivalent: 875–975) | — | — | — | — | — |
| "Epiclon HP-4032H" (epoxy equivalent: 250) | — | — | — | 60 | — |
| [A-2] Multifunctional Epoxy Resin | | | | | |
| "Epikote 154" (epoxy equivalent: 176–181, Sp: 10.8 cal$^{1/2}$/cm$^{2/3}$) | 10 | 25 | — | — | — |
| "Sumi-epoxy ELM-120" (epoxy equivalent: 118) | — | — | — | — | — |
| [B] Fine Rubber Particles(*1) | | | | | |
| "Kureha Paraloid EXL-2655" | 10 | — | 10 | — | — |
| "Paraloid EXL-2611" | — | — | — | 15 | — |
| "Staphyloid AC-3355" | — | 10 | — | — | — |
| "XER-91" | — | — | — | — | 7 |
| CTBN-Epoxy Reactant(*1) | — | — | — | — | — |
| [C] Curing Agent, Curing Accelerator(*1) | | | | | |
| DICY (dicyandiamide) | 4 | 4 | 4 | 4 | 4 |
| DCMU | 4 | 4 | 4 | 4 | 4 |
| Thermoplastic Resin(*1) | | | | | |
| "Vinylec K" (elastic modulus: 2.0 GPa, Sp: 11.5 cal$^{1/2}$/cm$^{2/3}$) | 3 | 5 | — | — | — |
| "Victrex 5003P" (elastic modulus: 2.6 GPa, Sp: 11.2 cal$^{1/2}$/cm$^{2/3}$) | — | — | 6 | — | — |
| Mean Epoxy Equivalent of Resin composition | 345 | 301 | 361 | 226 | 361 |
| Dynamic Visco-elasticity of Resin η* (Pa's) at 50° C. | 780 | 690 | 170 | 250 | 350 |
| Physical Properties of Composite Material | | | | | |
| Charpy Impact Value (KJ/m$^2$) | 139 | 130 | 147 | 151 | 142 |
| Glass Transition Temperature (° C.) | 130 | 138 | 125 | 150 | 128 |

TABLE 1-continued

| Resin Composition | Example 6 | Example 7 | Comparative Example 1 | Comparative Example 2 | Comparative Example 3 |
|---|---|---|---|---|---|
| [A] Epoxy Resin (wt. pts.) | | | | | |
| [A-1] Bi-functional Epoxy Resin | | | | | |
| "Epikote 828" (epoxy equivalent: 184–184, Sp: 10.6 cal$^{1/2}$/cm$^{2/3}$) | 30 | 45 | 30 | 30 | 40 |
| "Epikote 1001" (epoxy equivalent: 450–500, Sp: 11.5 cal$^{1/2}$/cm$^{2/3}$) | 60 | — | 35 | 35 | 60 |
| "Epikote 1004" (epoxy equivalent: 875–975) 10.8 cal$^{1/2}$/cm$^{2/3}$) | — | 40 | — | — | — |
| "Epiclon HP-4032H" (epoxy equivalent: 250) | — | — | — | — | — |
| [A-2] Multifunctional Epoxy Resin | | | | | |
| "Epikote 154" (epoxy equivalent: 176–181, Sp: | — | 35 | 35 | 35 | — |
| "Sumi-epoxy ELM-120" (epoxy equivalent: 118) | 10 | — | — | — | — |
| [B] Fine Rubber Particles(*1) | | | | | |
| "Kureha Paraloid EXL-2655" | 10 | 4 | 10 | — | — |
| "Paraloid EXL-2611" | — | — | — | — | — |
| "Staphyloid AC-3355" | — | — | — | — | — |
| "XER-91" | — | — | — | — | — |
| CTBN-Epoxy Reactant(*1) | — | — | — | — | 10 |
| [C] Curing Agent, Curing Accelerator(*1) | | | | | |
| DICY (dicyandiamide) | 4 | 4 | 4 | 4 | 4 |
| DCMU | 4 | 4 | 4 | 4 | 4 |
| Thermoplastic Resin(*1) | | | | | |
| "Vinylec K" (elastic modulus: 2.0 GPa, Sp: 11.5 cal$^{1/2}$/cm$^{2/3}$) | 8 | — | — | 4 | — |
| "Victrex 5003P" (elastic modulus: 2.6 GPa, Sp: 11.2 cal$^{1/2}$/cm$^{2/3}$) | — | — | — | — | — |
| Mean Epoxy Equivalent of Resin composition | 354 | 519 | 286 | 286 | 361 |
| Dynamic Visco-elasticity of Resin η* (Pa's) at 50° C. | 230 | 3100 | 210 | 680 | 270 |
| Physical Properties of Composite Material | | | | | |
| Charpy Impact Value (KJ/m$^2$) | 159 | 169 | 119 | 103 | 149 |
| Glass Transition Temperature (° C.) | 134 | 93 | 140 | 141 | 108 |

(*1)Parts by weight relative to 100 part by weight of epoxy resins.

As has been described in detail hereinabove, the epoxy resin composition of the present invention is suitably used as the matrix resin for prepregs. Typically, reinforcing fibers such as carbon fibers or glass fibers may be impregnated with the composition to give prepregs, which may be laminated and processed into fiber-reinforced composite materials or are wound around mandrels and processed into shafts, rods, etc.

While the invention has been described in detail and with reference to specific embodiments thereof, it will be apparent to one skilled in the art that various changes and modifications can be made therein without departing from the spirit and scope thereof.

What is claimed is:

1. A prepreg, comprising:

reinforcing fibers and a resin composition, said resin composition comprising:

an epoxy resin containing 70 parts by weight or more, per 100 parts by weight of said epoxy resin, of a bi-functional epoxy resin;

fine particles which comprise a crosslinked rubber phase and which are substantially insoluble in said epoxy resin; and a curing agent, wherein said resin composition has viscosity characteristics for making said prepreg so that said prepreg has tackiness and drapability sufficient for laying up said prepreg in a laminated structure, said resin composition having a complex coefficient of viscosity $\eta^*$ measured at 50° C. and at a frequency of 0.5 Hz of 200–2,000 Pa.s, and said fine particles have a mean particle size less than 50 $\mu$m.

2. The prepreg as claimed in claim 1, wherein the epoxy resin additionally contains from 1 to 30 parts by weight, relative to 100 parts by weight of the epoxy resin, of a tri-functional or more multifunctional epoxy resin.

3. The prepreg as claimed in claim 1, wherein the epoxy resin comprises 80 parts by weight or more, per 100 parts by weight of the epoxy resin, of a bi-functional epoxy resin.

4. The prepreg as claimed in claim 1, wherein the epoxy resin additionally contains from 1 to 20 parts by weight, relative to 100 parts by weight of the epoxy resin, of a tri-functional or more multifunctional epoxy resin.

5. The prepreg as claimed in claim 1, wherein the total epoxy equivalent of the epoxy resin is 250 or more.

6. The prepreg as claimed in claim 5 wherein the total epoxy equivalent of the epoxy resin of the constitutive element [A] is from 250 to 400.

7. The prepreg as claimed in claim 1, wherein the fine particles are fine particles of crosslinked rubber.

8. The prepreg as claimed in claim 1, wherein the fine particles are fine core/shell polymer particles.

9. The prepreg as claimed in claim 8, wherein the core/shell polymer particles are soft core/hard shell particles.

10. The prepreg as claimed in claim 8, wherein the core/shell polymer particles are such that the core consists essentially of a polybutadiene or polybutyl acrylate and the shell consists essentially of an acrylate or methacrylate polymer.

11. The prepreg as claimed in claim 8, wherein the shell phase in the core/shell polymer particles contains no functional groups reactive with the epoxy resin and with the curing agent.

12. The prepreg as claimed in claim 1, which contains the fine particles in an amount of from 1 to 20 parts by weight relative to 100 parts by weight of the epoxy resin [A].

13. The prepreg as claimed in claim 1, wherein the curing agent is dicyandiamide and contains a curing promoter.

14. The prepreg as claimed in claim 1, wherein the reinforcing fibers are selected from the group consisting of carbon fibers, aromatic polyamide fibers, glass fibers, silicon carbide fibers, boron fibers, alumina fibers and stainless steel fibers.

15. The prepreg as claimed in claim 14, wherein the reinforcing fibers are carbon fibers having a modulus of elastic modulus of 200 GPa or more.

16. A fiber-reinforced composite material comprising the cured epoxy resin composition as claimed in claim 1 and reinforcing fibers.

* * * * *